US009621645B2

(12) United States Patent
Smus et al.

(10) Patent No.: US 9,621,645 B2
(45) Date of Patent: Apr. 11, 2017

(54) DEVICE PAIRING VIA A CLOUD SERVER

(71) Applicant: Google Inc., Mountain View, CA (US)

(72) Inventors: Boris Smus, San Francisco, CA (US); Christian Plagemann, Palo Alto, CA (US); Trond Thomas Wuellner, Mountian View, CA (US); Antonio Bernardo Monteiro Costa, San Francisco, CA (US); Alejandro José Kauffmann, San Francisco, CA (US)

(73) Assignee: Google Inc., Mountain View, CA (US)

( * ) Notice: Subject to any disclaimer, the term of this patent is extended or adjusted under 35 U.S.C. 154(b) by 235 days.

(21) Appl. No.: 14/144,427

(22) Filed: Dec. 30, 2013

(65) Prior Publication Data

US 2015/0189006 A1    Jul. 2, 2015

(51) Int. Cl.
| | |
|---|---|
| G06F 15/16 | (2006.01) |
| H04L 29/08 | (2006.01) |
| G06F 3/00 | (2006.01) |
| H04B 11/00 | (2006.01) |
| H04L 29/06 | (2006.01) |
| H04W 4/00 | (2009.01) |

(52) U.S. Cl.
CPC .............. *H04L 67/104* (2013.01); *G06F 3/00* (2013.01); *H04B 11/00* (2013.01); *H04L 67/16* (2013.01); *H04L 69/24* (2013.01); *H04W 4/003* (2013.01)

(58) Field of Classification Search
CPC ..... H04L 65/403; H04L 67/16; H04L 67/104; H04L 69/24; G06F 3/00; H04B 11/00; H04W 4/003

USPC ......................................................... 709/204
See application file for complete search history.

(56) References Cited

U.S. PATENT DOCUMENTS

| | | | |
|---|---|---|---|
| 6,445,716 B1 * | 9/2002 | Favichia ................. | H04L 69/24 370/466 |
| 8,312,392 B2 | 11/2012 | Forutanpour et al. | |
| 8,370,501 B2 | 2/2013 | Shen et al. | |
| 8,457,651 B2 | 6/2013 | Forutanpour et al. | |
| 9,130,664 B2 * | 9/2015 | Jin ......................... | H04B 11/00 |

(Continued)

FOREIGN PATENT DOCUMENTS

WO      2013/071209 A1      5/2013

OTHER PUBLICATIONS

"Serious Technology", Circle 38 Inc., retrieved from <http://www.circlewithme.com/portfolio/technology> on Dec. 30, 2013, 2 pages.

(Continued)

*Primary Examiner* — June Sison
*Assistant Examiner* — Dixon Dabipi
(74) *Attorney, Agent, or Firm* — McDermott Will & Emery LLP

(57) ABSTRACT

Methods for device pairing via a cloud server are provided. In one aspect, a method includes sending an initial signal from a first device to a second device. The method includes sending a notification from the first device of a set of communication capabilities of the first device. The method also includes receiving an indication of a common communication capability between the first and second devices. The method includes initiating pairing of the first device and the second device using the common communication capability in response to the received indication. Systems and machine-readable media are also provided.

17 Claims, 5 Drawing Sheets

(56) References Cited

U.S. PATENT DOCUMENTS

| | | | |
|---|---|---|---|
| 2005/0273609 A1* | 12/2005 | Eronen | H04L 63/0428 |
| | | | 713/171 |
| 2010/0278345 A1* | 11/2010 | Alsina | H04L 63/0492 |
| | | | 380/283 |
| 2011/0070834 A1* | 3/2011 | Griffin | G06K 7/10237 |
| | | | 455/41.1 |
| 2011/0159959 A1 | 6/2011 | Mallinson et al. | |
| 2011/0210820 A1 | 9/2011 | Talty et al. | |
| 2011/0314168 A1* | 12/2011 | Bathiche | H04W 12/06 |
| | | | 709/228 |
| 2012/0077442 A1* | 3/2012 | Piazza | H04W 8/005 |
| | | | 455/67.11 |
| 2012/0220217 A1* | 8/2012 | Kravitz | H04W 88/04 |
| | | | 455/39 |
| 2012/0322376 A1 | 12/2012 | Couse | |
| 2013/0115880 A1 | 5/2013 | Dal Bello et al. | |
| 2014/0148094 A1* | 5/2014 | Park | G06Q 50/01 |
| | | | 455/41.1 |
| 2014/0273820 A1* | 9/2014 | Narayan | H04W 76/023 |
| | | | 455/41.1 |
| 2015/0100463 A1* | 4/2015 | Drazin | G06Q 10/101 |
| | | | 705/27.1 |
| 2015/0120838 A1* | 4/2015 | Vadla Ravnas | G06Q 10/10 |
| | | | 709/204 |

OTHER PUBLICATIONS

"Proximity Pairing of Smartphones with Ultra-High Frequency Sound Waves", Circle 38, retrieved from <circlewithme.tumblr.com/post/25893923940/proximity-pairing-sound-waves>, 2012-2013, 3 pages.

Peng, "Point&Connect: Intention-Based Device Pairing for Mobile Phone Users", MobiSys '09, Jun. 22-25, 2009, pp. 137-149, Krakow, Poland.

Chong, "GesturePIN: Using Discrete Gestures for Associating Mobile Devices", MobileHCI '10, Sep. 7-10, 2010, pp. 261-264, Lisbon, Portugal.

Guse, "Gesture-Based User Authentication on Mobile Devices using Accelerometer and Gyroscope", Master Thesis, May 31, 2011, Corrected Version Aug. 8, 2011, 110 pages.

* cited by examiner

DEVICE PAIRING VIA A CLOUD SERVER

BACKGROUND

Field

The present disclosure generally relates to the transmission of data over a network, and more particularly to the connection of a device with another device.

Description of the Related Art

Pairing is a process used in computer networking that establishes a connection between computing devices to allow data transfer between them. For example, a Bluetooth enabled mobile phone may be paired to a Bluetooth headset. When the mobile phone and headset are paired together, the user of the mobile phone may use the speaker and microphone of the headset instead of the speaker and microphone of the mobile phone.

SUMMARY

According to one embodiment of the present disclosure, a computer-implemented method for device pairing via a cloud server is provided. The method includes sending an initial signal from a first device to a second device. The method includes sending a notification to a server, wherein the notification comprises a set of communication capabilities of the first device. The method also includes receiving, from the server, an indication of a common communication capability between the first and second devices. The method includes initiating pairing of the first device and the second device using the common communication capability in response to the received indication.

According to one embodiment of the present disclosure, a system for device pairing via a cloud server is provided. The system includes a memory storing executable instructions and a processor configured to execute the executable instructions stored in the memory to send an initial signal from a first device to a second device. The processor is also configured to send a notification from the first device to the second device of a set of communication capabilities of the first device. The processor is also configured to receive, from the second device, an indication of a common communication capability between the first and second devices. The processor is also configured to, in response to the received indication, initiate pairing of the first device and the second device using the common communication capability.

According to one embodiment of the present disclosure, a non-transitory machine-readable medium embodying instructions is provided. These instructions, when executed by a machine, allow the machine to perform a method. The method includes sending an initial signal from a first device to a second device, wherein the initial signal is sent via an inaudible ultrasonic frequency. The method also includes sending a notification to a server, wherein the notification comprises a set of communication capabilities of the first device. The method also includes receiving, from the server, an indication of a common communication capability between the first and second devices. The method also includes, in response to the received indication, initiating pairing of the first device and the second device using the common communication capability.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Pairing one device to another device commonly involves multiple steps for the user. For example, in order to pair two devices over Bluetooth, a pairing mode needs to be initiated on the first device. The second device then recognizes the first device, and the user inputs a pairing code into the second device. Performing these series of steps may be bothersome to the user of the devices. A preferred solution would be to have the devices pair to each other automatically.

In another example, two devices may connect to a common local area network (e.g., WiFi) and utilize a discovery protocol in order to pair with each other. For example, if a user who is visiting his friend's house wishes to pair his WiFi capable phone to his friend's WiFi capable television, the user will need access to his friend's WiFi connection. However, in some situations, the user's friend may not wish to grant the user access to the WiFi connection. A preferred situation would be to have the user's phone and the friend's television paired to each other while using independent network connections.

In another example, two devices may not be able to pair with one another because they do not have matching capabilities. For example, the first device may be configured to use WiFi while the second device is configured to use Bluetooth. In some cases, it is not immediately obvious to the user what each device's capabilities are. A preferred approach would be to have the two devices determine a common communications capability without user involvement.

The disclosed application provides device pairing via a cloud server. An initial signal is sent from a first device to a second device, indicating to the second device that the first device is requests pairing to the second device. The first device and the second device each send notifications of their respective communications capabilities. In some aspects, the first and second devices send their respective notifications to a cloud server. In some aspects, the first and second devices send their respective notifications to the other device. The first device receives an indication of a common communication capability between the first and second device, and in response to the indication, initiates pairing of the first device with the second device.

Figure 1:
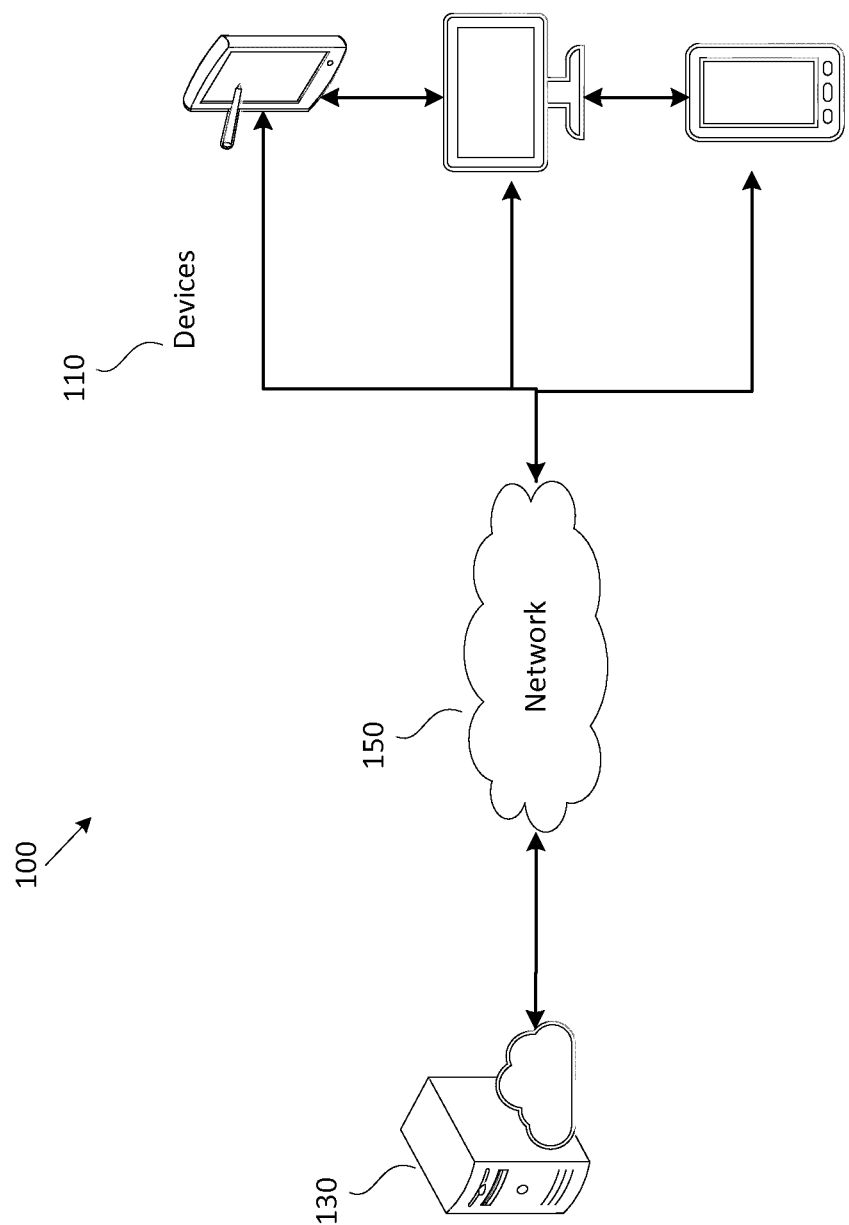
FIG. 1 illustrates an example architecture for device pairing via a cloud server.

FIG. 1 illustrates an example architecture 100 for device pairing via a cloud server. The architecture 100 includes servers 130 and clients 110 connected over a network 150.

Each of the many clients 110 is configured to connect to the network 150 or to other clients 110. The clients 110 can be, for example, desktop computers, mobile computers, tablet computers (e.g., including e-book readers), mobile devices (e.g., a smartphone or PDA), set top boxes (e.g., a television), video game consoles, or any other devices having appropriate processor, memory, and communications capabilities for connecting to the network 150 or connecting to other devices.

The servers 130 can be any device having an appropriate processor, memory, and communications capability for facilitating communications between devices 110. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
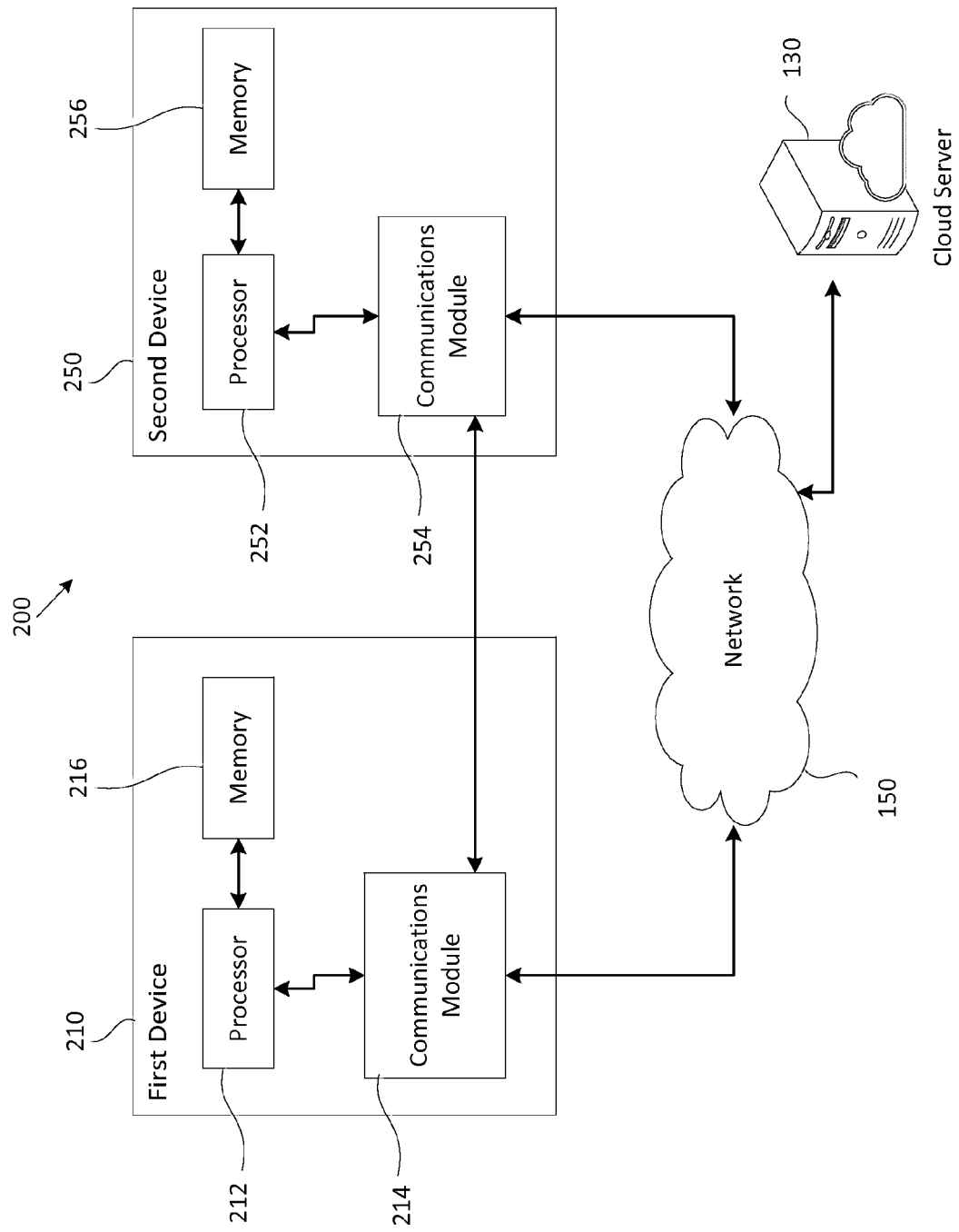
FIG. 2 is a block diagram illustrating example clients and an example server from the architecture of FIG. 1 according to certain aspects of the disclosure.

FIG. 2 is a block diagram 200 illustrating example clients 210, 250 and server 130 in the architecture 100 of FIG. 1 according to certain aspects of the disclosure. The clients 210, 250 and the server 130 are connected over the network 150.

The clients 210, 250 include a processor 212, 252, a communications module 214, 254, and memory 216, 256. The communications module 214, 254 is configured to interface with the network 150 to send and receive information, such as data, requests, responses, and commands to other devices on the network. The communications module 214, 254 can be, for example, modems or Ethernet cards. The communications module 214, 254 may also be configured to interface with other devices (i.e., first device 210 and second device 250) to send and receive information, such as data, requests, responses, and commands to other devices on the network. The communications module 214, 254 can be, for example, audio communications modules (i.e., a speaker and microphone), Bluetooth modules or Near Field Communication ("NFC") modules. In some aspects, the communications module 214, 254 is capable of connecting to the network 150, but not to other devices 110. In some aspects, the communications module 214, 254 is capable of connecting to other devices 110, but not to the network 150.

In example aspects, the first device 210 sends an initial signal to the second device 250 notifying the second device 250 of a pairing request. The initial signal prompts the second device 250 to notify the cloud server 130 to send a notification of its communications capabilities. The first device 210 also sends a notification of its communications capabilities to the cloud server 130. The cloud server 130 determines a common communications capability between the first device 210 and the second device 250, and sends an indication of the common communication capability to the first device 210. The first device 210 initiates pairing to the second device 250 using the common communications capability determined by the cloud server 130.

In some aspects, data transfer between the first device 210 and second device 250 is performed directly between the two devices 210, 250. In some aspects, data transfer is performed by using the cloud server 130 as an intermediary. That is, in order for the first device 210 to send data to the second device 250, the first device 210 sends data to the cloud server 130, and the cloud server sends the data to the second device 250. Accordingly, in order for the second device 250 to send data to the first device 210, the second device 250 sends data to the cloud server 130 and the cloud server sends the data to the first device 210.

Figure 3:
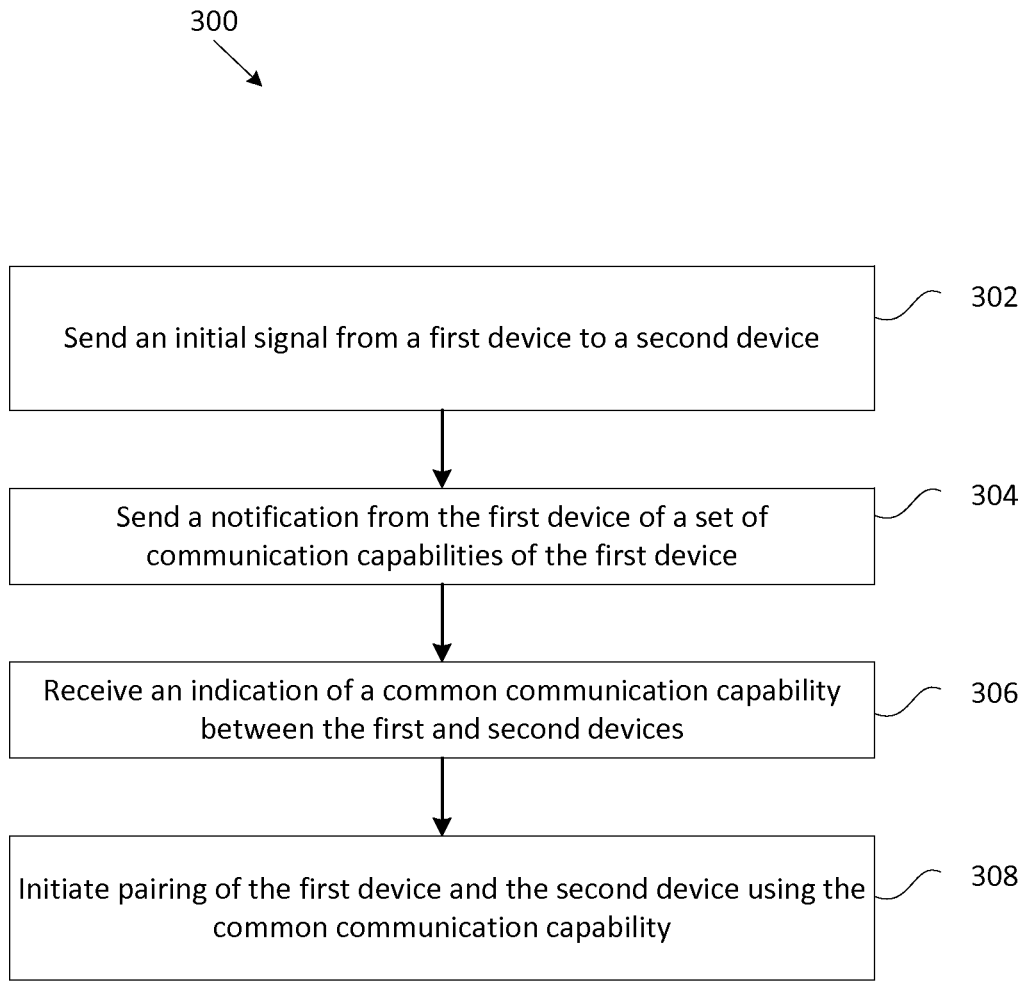
FIG. 3 illustrates an example process for device pairing via a cloud server using the example client of FIG. 2.

FIG. 3 illustrates an example process 300 for device pairing via a cloud server using the example clients 210, 250 and cloud server 130 of FIG. 2. While FIG. 3 is described with reference to FIG. 2, it should be noted that the process blocks of FIG. 3 may be performed by other systems.

The process 300 begins at block 302 in which a first device 210 sends an initial signal to a second device 250. In some aspects, the initial signal from the first device 210 to the second device 250 prompts the second device 250 to send the cloud server 130 a notification of its communications capabilities.

In some aspects, the initial signal may be sent via a sound with an inaudible ultrasonic frequency. An inaudible ultrasonic frequency may in the spectrum of 19 kHz or greater. Detection of the initial inaudible ultrasonic frequency audio signal may be accomplished by using a bandpass filter, and triggering second stage analysis in software. A microphone may be turned on, and Fourier analysis may be performed on the received inaudible ultrasonic frequency audio signal to get a frequency domain signal. In some aspects, particular frequency ranges may be analyzed for peaks. In some aspects, particular frequency ranges may be analyzed for an amplitude that is greater than a threshold, or greater than nearby frequency amplitudes. The initial signal may be sent via other techniques, for example, Bluetooth or NFC. In some aspects, devices with Bluetooth capabilities may periodically scan for initial signals broadcasted over Bluetooth. The initial signal may be sent by broadcasting it over Bluetooth.

In some aspects, the initial signal is sent by the first device upon receiving input from a user. For example, the input may be a button tap on the device, a voice command given to the device, or a physical movement of the device. Examples of a physical movement that may trigger the initial signal are: quickly moving the first device toward a second device while the screens of both devices are facing each other, sliding the first device toward the second device while both are laying on a surface, laying a first device down next to a second device on a surface, rotating a first device while both devices are on a surface, touching the screen of a first device to the screen of a second device, laying a first device on top of a second device, waving a first device over a second device while both screens are facing each other, waving a first device over a second device while both screens are facing the same direction, repeatedly quickly moving the first device toward a second device while the screens of both devices are facing each other, simultaneously tapping the screens of the two devices while they are laying on a surface, raising the edge of one of two devices which are laying on a surface, tapping a first device using the corner of a second device, tapping the back of a first device while the screens of the first and second devices are facing each other.

The physical movement may be detected by the first device 210 using an accelerometer in the first device 210. The physical movement may also be detected using a tilt sensor in the first device 210.

The process 300 proceeds to block 304, in which the first device 210 sends a notification to the cloud server 130, of a set of communication capabilities of the first device 210. Examples of communications capabilities include audio communication, Bluetooth, NFC, and WiFi. In some aspects, the audio communications capabilities may be unilateral. Unilateral audio communication is used when the first device 210 is capable of sending an audio signal (e.g., has a speaker) and the second device 250 is capable of receiving an audio signal (e.g., has a microphone). In some aspects, the audio communications capabilities may be bilateral. Bilateral audio communication is used when the first device 210 and the second device 250 are both capable of sending and receiving an audio signal.

In some aspects, the cloud server 130 also receives a notification of a set of communications capabilities from the second device 250. In some aspects, the first device 210 and the second device 250 each send the cloud server 130 a list of their respective communications capabilities. In some aspects, the first device 210 and the second device 250 each send the cloud server 130 their respective device identifiers. The device identifiers may contain information the cloud server 130 may use to determine a common communications capability. The cloud server 130 may obtain communications capabilities of the devices 210, 250 by looking up the device identifiers on a table containing communications capabilities indexed by device identifiers.

The cloud server 130 selects a common communication capability for pairing the first device 210 to the second device 250, based on the communications capabilities information received from the first device 210 and the second device 250. In some aspects, the cloud server 130 may select any common capability between the first device 210 and the second device 250 as the common communications capability. In some aspects, the cloud server 130 may determine the common communication capability based on the speed of data transfer between the two devices 210, 250. In some aspects, the cloud server 130 may determine the common communication capability based on the battery consumption of the devices 210, 250. The cloud server 130 may determine the common communication capability based on the connection reliability of the devices 210, 250 and the communication capabilities of the devices 210, 250. For example, the cloud server 130 may determine the common communication capability is one that is not the fastest communication capability based on speed of data transfer, but one that is more reliable. Reliability may be determined based on, for example, connection failure rates, rates of lost data.

In some aspects, instead of sending the notification in block 304 to the cloud server 130, the notification of a set of communication capabilities of the first device 210 is sent to the second device 250. The second device 250 may select a common communication capability for pairing the first device 210 to the second device 250. In some aspects, the second device 250 may select any common capability between the first device 210 and the second device 250 as the common communications capability. In some aspects, the second device 250 may determine the common communication capability based on the speed of data transfer between the two devices 210, 250. In some aspects, the second device 250 may determine the common communication capability based on the battery consumption of the devices 210, 250. The second device 250 may determine the common communication capability based on the connection reliability of the devices 210, 250 and the communication capabilities of the devices 210, 250. For example, the second device 250 may determine the common communication capability is one that is not the fastest communication capability based on speed of data transfer, but one that is more reliable. Reliability may be determined based on, for example, connection failure rates, rates of lost data.

The process 300 proceeds to block 306, in which the first device 210 receives, from the server, an indication of a common communication capability between the first device 210 and the second device 250. As discussed above, the common communication capability may be determined by one or more of the following considerations: speed of data transfer between the devices 210, 250; battery consumption; and connection reliability.

The process 300 proceeds to block 308, in which pairing of the first device 210 and the second device 250 are initiated using the common communication capability.

FIG. 3 sets forth an example process 300 for device pairing via a cloud server using the example devices 210, 250 and example cloud server 130 of FIG. 2. An example will now be described using the example process 300 of FIG. 3, a first device 210 that is a smartphone, having a communications module 214 that is capable of audio, Bluetooth, and NFC. The example will also be described using a second device 250 that is a tablet, having a communications module 254 that is capable of audio, Bluetooth, and WiFi.

The process 300 begins at block 302, in which the smartphone 210 sends an initial signal to the tablet 250. As previously discussed, the initial signal may be sent via a sound with an inaudible ultrasonic frequency, Bluetooth, NFC, or other techniques.

The process 300 proceeds to block 304, in which the smartphone 210 sends a notification to the cloud server 130 of its set of communication capabilities (e.g., audio, Bluetooth, and NFC).

The tablet 250 also sends a notification of its communications capabilities to the cloud server 130. The cloud server 130 determines a common communications capability between the smartphone 210 and the tablet 250. Possible common communications capabilities between the smartphone 210 and tablet 250 are audio and Bluetooth. As previously discussed, the cloud server 130 may determine a common communications capability in a different number of ways. In this example, the cloud server 130 determines that Bluetooth is the common communications capability shared by the smartphone 210 and the tablet 250.

The process 300 proceeds to block 306, in which the smartphone 210 receives, from the server 130, an indication that Bluetooth is a common communications capability between the smartphone 210 and the tablet 250. The process 300 proceeds to block 308, in which the smartphone 210 initiates pairing with the tablet 250 using Bluetooth.

Figure 4:
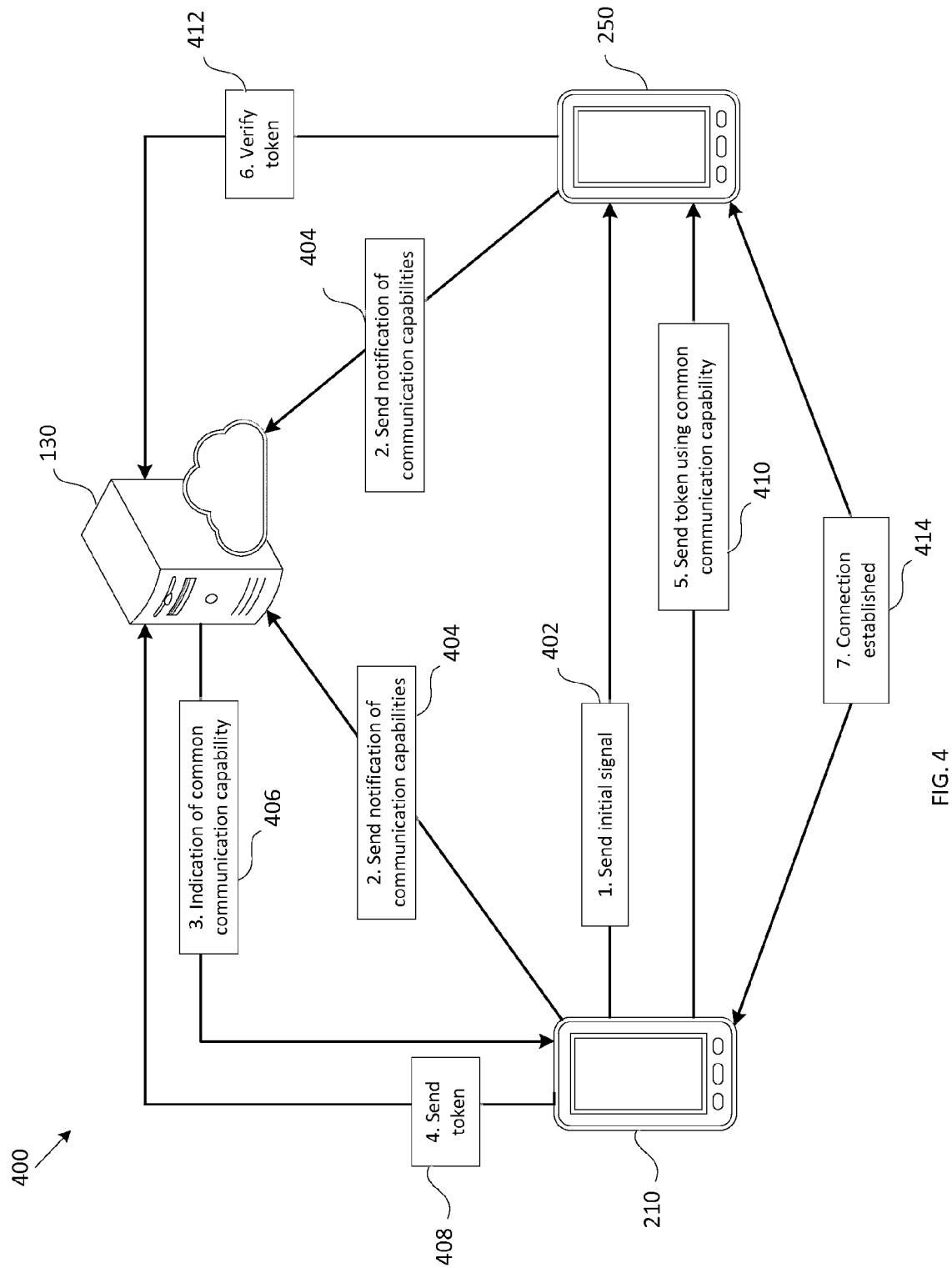
FIG. 4 illustrates an example process for device pairing via a cloud server using the example client of FIG. 2.

FIG. 4 illustrates an example process 400 for device pairing via a cloud server using the example clients 210, 250 and cloud server 130 of FIG. 2. While FIG. 4 is described with reference to FIG. 2, it should be noted that the process blocks of FIG. 4 may be performed by other systems. The process illustrated in FIG. 4 may be used when the second device 250 is unable to transmit data directly to the first device 210. For example, if the common communications capability is unilateral audio, where the first device 210 has a speaker and the second device 250 has a microphone, the second device 250 is unable to transmit data directly to the first device 210.

The process 400 begins at block 402, in which a first device 210 sends an initial signal to a second device 250. In some aspects, the initial signal may be sent via a sound with an inaudible ultrasonic frequency. In some aspects, the initial signal is sent by the first device upon receiving input from a user. For example, the input may be a button tap on the device, a voice command given to the device, or a physical movement of the device.

At block 404, the first device 210 and the second device 250 send notification of communication capabilities to the cloud server 130. Examples of communications capabilities include audio communication, Bluetooth, NFC, and WiFi. In some aspects, the audio communications capabilities may be unilateral. Unilateral audio communication is used when the first device 210 is capable of sending an audio signal (e.g., has a speaker) and the second device 250 is capable of receiving an audio signal (e.g., has a microphone). In some aspects, the audio communications capabilities may be bilateral. Bilateral audio communication is used when the first device 210 and the second device 250 are both capable of sending and receiving an audio signal.

At block 406, the cloud server 130 determines a common communications capability between the first device 210 and the second device 250, and indicates the common communications capability to the first device 210. The cloud server 130 selects a common communication capability for pairing the first device 210 to the second device 250, based on the communications capabilities information received from the first device 210 and the second device 250. The cloud server 130 may determine the common communication capability based on the speed of data transfer between the two devices 210, 250.

At block 408, the first device 210 sends a token to the cloud server 130. In some aspects, the token is used to create a paired connection between the first device 210 and the second device 250. A token may be any bits of data. For example, a token may be a number, a word, or a combination of letters and numbers.

The token sent by the first device 210 is received by the cloud server 130, and the cloud server 130 may later receive a verification request from the second device 250. If the token received by the second device 250 matches the token received by the cloud server 130, the connection is secure. That is, both the second device 250 and the cloud server 130 have verification that they are both communicating with the same device (e.g., the first device 210).

At block 410, the first device 210 sends the token to the second device 250 using the common communication capability. At block 412, the second device 250 verifies the token with the cloud server 130, which received the token from the first device 210 in block 408. At block 414, a connection between the first device 210 and the second device 250 is established. If the second device 250 is unable to transmit data directly to the first device 210, then data transfer may be facilitated by the cloud server 130.

Figure 5:
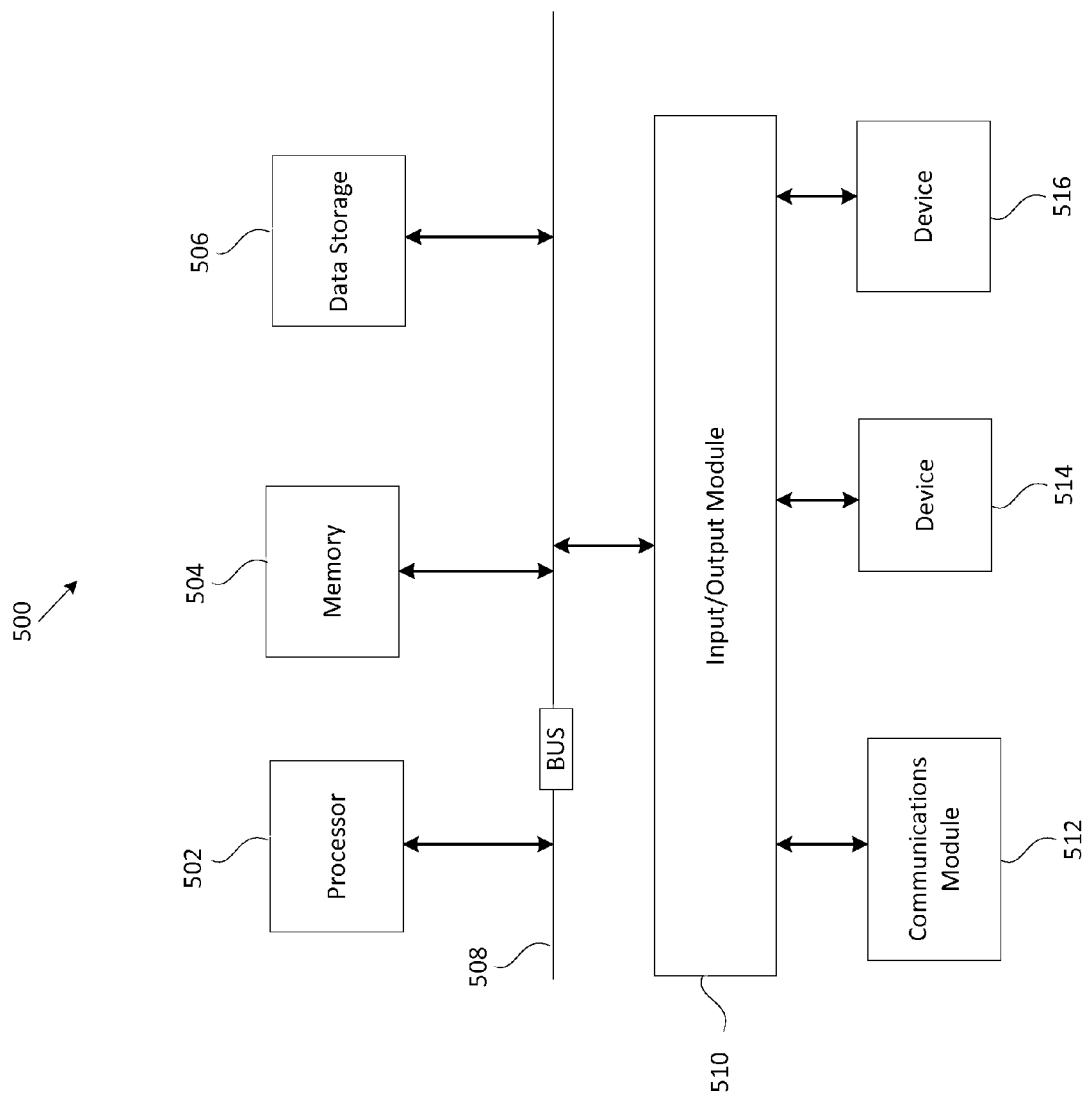
FIG. 5 is a block diagram illustrating an example computer system with which some implementations of the subject technology can be implemented.

FIG. 5 is a block diagram illustrating an example computer system 500 with which some implementations of the subject technology can be implemented. In certain aspects, the computer system 500 may be implemented using hardware or a combination of software and hardware, either in a dedicated server, or integrated into another entity, or distributed across multiple entities.

Computer system 500 (e.g., clients 110 and server 130) includes a bus 508 or other communication mechanism for communicating information, and a processor 502 (e.g., processor 212) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 216), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 214) include networking interface cards, such as Ethernet cards and modems. In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. To the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method comprising:
   sending an initial signal from a first device to a second device, wherein the initial signal prompts the second device to send a first notification comprising a set of communication capabilities of the second device to a server;
   sending a second notification from the first device to the server, wherein the second notification comprises a set of communication capabilities of the first device;
   receiving, from the server, an indication of a common communication capability between the first and second devices;
   generating, by the first device, a pairing token;
   sending the pairing token from the first device to the server;
   sending the pairing token from the first device to the second device using the common communication capability; and
   initiating pairing of the first device and the second device using the common communication capability, based on a verification that the pairing token sent to the server matches the pairing token sent to the second device.

2. The computer-implemented method of claim 1, wherein the initial signal is sent via an inaudible ultrasonic frequency.

3. The computer-implemented method of claim 2, wherein the inaudible ultrasonic frequency is in the spectrum of 19 kHz or greater.

4. The computer-implemented method of claim 1, wherein the initial signal is triggered by a physical movement of the first device.

5. The computer-implemented method of claim 4, wherein the physical movement of the device is at least one of: quickly moving the first device toward the second device while screens of both devices are facing each other, sliding the first device toward the second device while both devices are laying on a surface, laying the first device down next to the second device on the surface, or waving a first device over a second device while the screens of both devices are facing each other.

6. The computer-implemented method of claim 1, wherein the common communication capability is at least one of: Bluetooth Wireless Standard, Near Field Communication, WiFi, unilateral audio, or bilateral audio.

7. The computer-implemented method of claim 1, further comprising pairing the first device to the second device, wherein data transfer of the pairing is accomplished through the server.

8. A system comprising:
   a memory storing executable instructions; and
   a processor configured to execute the executable instructions stored in the memory to:
      send an initial signal from a first device to a second device, wherein the initial signal prompts the second device to send a first notification comprising a set of communication capabilities of the second device to a server;
      send a second notification to the server, wherein the second notification comprises a set of communication capabilities of the first device;
      receive, from the server, an indication of a common communication capability between the first and second devices;
      generate, by the first device, a pairing token;
      send the pairing token from the first device to the server;
      send the pairing token from the first device to the second device using the common communication capability; and
      initiate pairing of the first device and the second device using the common communication capability, based on a verification that the pairing token sent to the server matches the pairing token sent to the second device.

9. The system of claim 8, wherein the initial signal is sent via an inaudible ultrasonic frequency.

10. The system of claim 8, wherein the initial signal is triggered by a physical movement of the first device.

11. The system of claim 10, wherein the physical movement of the device is at least one of: quickly moving the first device toward the second device while screens of both devices are facing each other, sliding the first device toward the second device while both devices are laying on a surface, laying the first device down next to the second device on the surface, or waving a first device over a second device while the screens of both devices are facing each other.

12. The system of claim 8, wherein the common communication capability is at least one of: Bluetooth Wireless Standard, Near Field Communication, WiFi, unilateral audio, or bilateral audio.

13. The system of claim 8, wherein the processor is further configured to pair the first device to the second device, wherein data transfer of the pairing is accomplished through the server.

14. A non-transitory machine-readable medium embodying instructions that, when executed by a machine, allow the machine to perform a method comprising:
- sending an initial signal from a first device to a second device, wherein the initial signal is sent via an inaudible ultrasonic frequency and prompts the second device to send a first notification comprising a set of communication capabilities of the second device to a server;
- sending a second notification to the server, wherein the second notification comprises a set of communication capabilities of the first device;
- receiving, from the server, an indication of a common communication capability between the first and second devices;
- generating, by the first device, a pairing token;
- sending the pairing token from the first device to the server;
- sending the pairing token from the first device to the second device using the common communication capability; and
- initiating pairing of the first device and the second device using the common communication capability, based on a verification that the pairing token sent to the server matches the pairing token sent to the second device.

15. The non-transitory machine-readable medium of claim 14, wherein the inaudible ultrasonic frequency is in the spectrum of 19 kHz or greater.

16. The non-transitory machine-readable medium of claim 14, wherein the initial signal is triggered by a physical movement of the first device.

17. The non-transitory machine-readable medium of claim 14, further comprising pairing the first device to the second device, wherein data transfer of the pairing is accomplished through the server.

* * * * *